R. F. MASSA.
AUTOMATIC REFRIGERATING APPARATUS.
APPLICATION FILED JULY 9, 1906.
929,151.
Patented July 27, 1909.
2 SHEETS—SHEET 1.
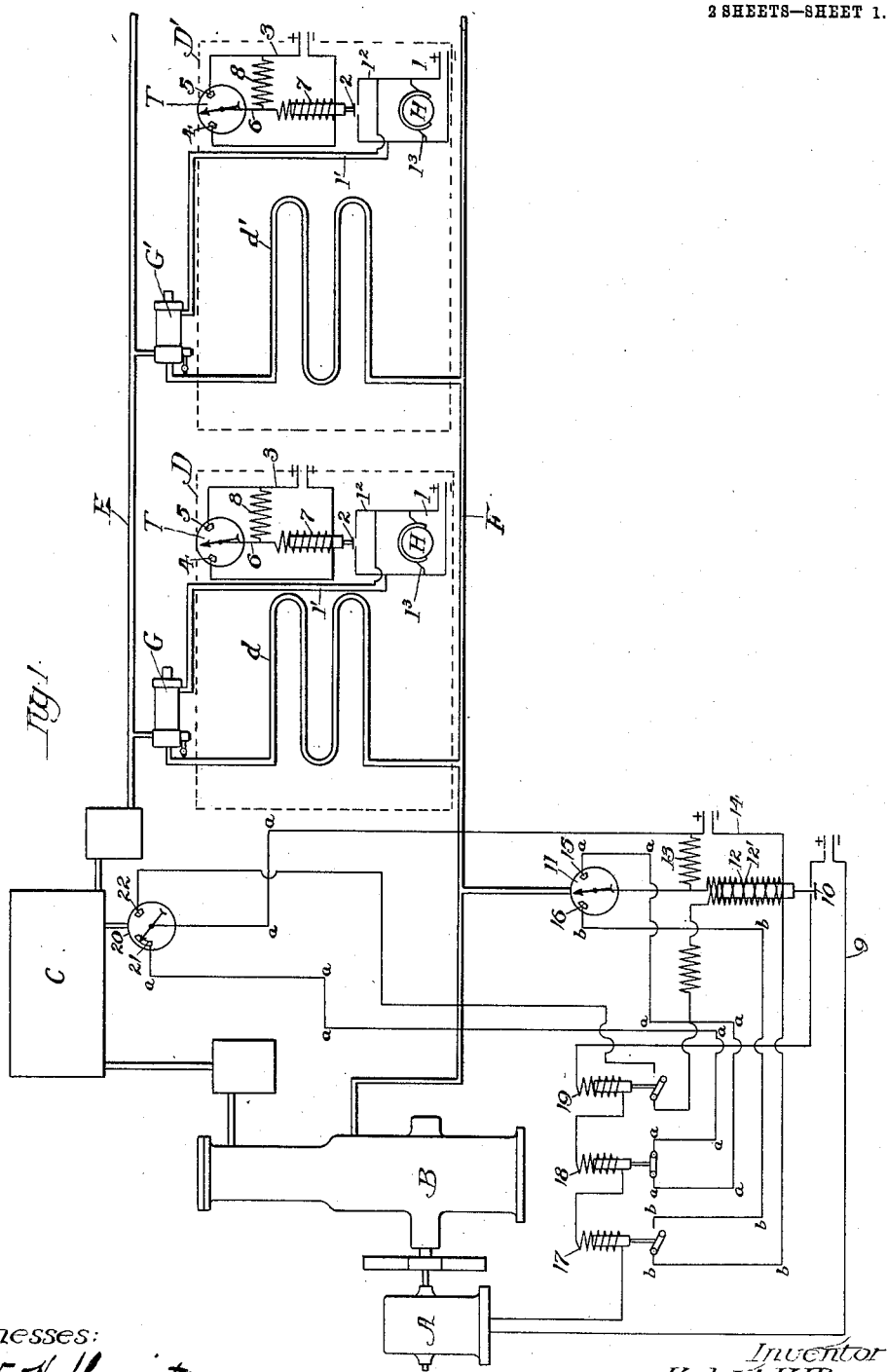
Witnesses:
F. W. Hoffmeister.
C. H. Miller.
Inventor
Robert F. Massa.
By J. C. Warner
Attorney R. F. MASSA.
AUTOMATIC REFRIGERATING APPARATUS.
APPLICATION FILED JULY 9, 1906.
929,151.
Patented July 27, 1909.
2 SHEETS—SHEET 2.
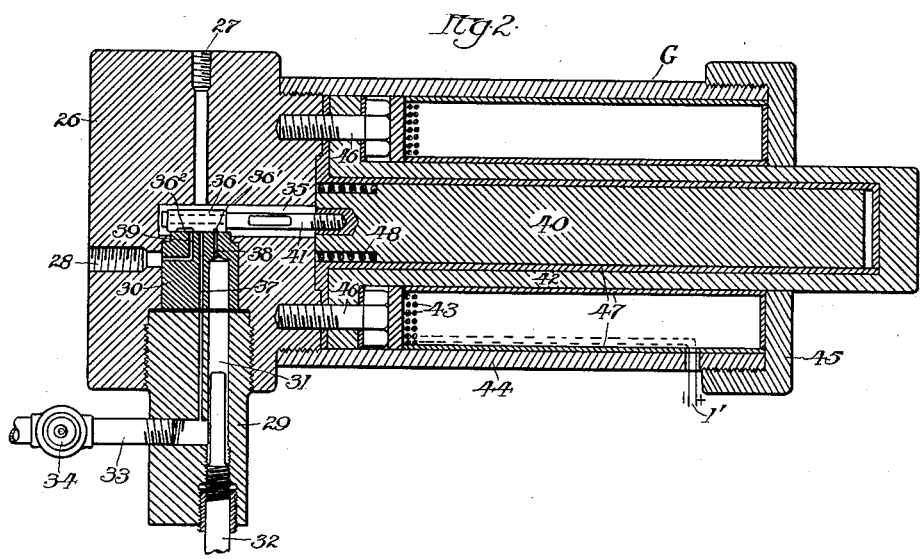
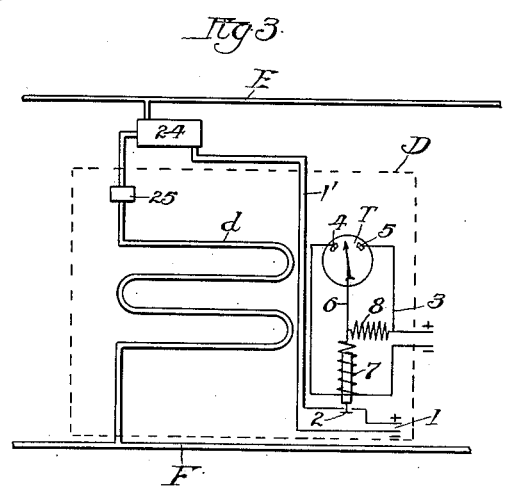
Witnesses:
F. W. Hoffmeister.
C. H. Miller.
Inventor:
Robert F. Massa
By J. C. Warnes,
Attorney

UNITED STATES PATENT OFFICE.

ROBERT F. MASSA, OF CHICAGO, ILLINOIS.

AUTOMATIC REFRIGERATING APPARATUS.

No. 929,151.      Specification of Letters Patent.      Patented July 27, 1909.

Application filed July 9, 1906. Serial No. 325,209.

*To all whom it may concern:*

Be it known that I, ROBERT F. MASSA, a citizen of the United S'ates, residing at Chicago, in the county of Cook and State of Illinois, have invented a new and useful Improvement in Aucomatic Refrigerating Apparatus, of which the following is a complete specification.

This invention relates to an automatic electrically controlled system of refrigeration in which a plurality of refrigerating compartments may be employed; and more particularly to that class in which the refrigerating medium is controlled in its admission to the expansion coils by thermostatic connections actuated by temperature variations and independent of the coil pressure or pressure actuated means while the stopping and starting of the compressor are controlled by variations in pressure in the high and low pressure sides of the system.

In the apparatus herein disclosed the employment of anhydrous ammonia is contemplated but this system is equally applicable when it is desired to use some other refrigerating medium.

The object in view is to provide a simple and efficient automatic refrigerating apparatus capable of maintaining different degrees of temperature in a number of refrigerating compartments; to stop the compressor automatically in the event of an excessive pressure in the condenser, to control the motor through variations of pressure in the return to the compressor, to meter the refrigerating medium when admitting it to the expansion coils, and to protect the electrical contact points of the thermostat and pressure gages from the injurious effects of sparking or arcs when contact is broken. It is often desirable to meter the refrigerant in order to determine the amount supplied to the various compartments.

The general plan is as follows: a compressor, a condenser, a high pressure feed pipe, a low pressure return or suction pipe, and one or more expansion coils in refrigerating compartments are provided. The refrigerating medium is supplied to each coil through an electrically operated meter valve located in a branch of the high pressure pipe and which is controlled by suitable connection with a thermostat in the corresponding compartment. The movement of the compressor is controlled by pressure gages placed on the high and the low pressure sides of the system, the said gages operating through electrical connections and solenoids to open and close the switches. Auxiliary switches are preferably introduced to protect the contact points of the pressure gages from the injurious effects of sparking or arcing.

The arrangement and operation of the improvement are clearly illustrated in the accompanying drawings, in which—

Figure 1 represents a diagrammatic view of the apparatus. Fig. 2 is a detail section of the meter valve, and Fig. 3 is a modification designed as a substitute for the meter valve and the parts controlling same.

Referring to the drawings A designates a motor, B a compressor directly connected therewith and C a condenser all of which may be of any approved form.

D, $D^1$, etc., represent a plurality of refrigerating chan.bers only two being shown however and $d$, $d^1$ etc. represent the expansion coils located therein. The pipe E conducts the refrigerating medium under high pressure from the condensing chamber C to the expansion coils $d$, $d^1$ etc., and the suction or return pipe F conducts the same from the expansion coils back to the compressor B. The refrigerant is admitted from the pipe E on the high pressure side of the system to the expansion coils through the meter valves G, $G^1$ etc., these valves operating both to measure the amount admitted and to act as expansion valves on the material passed through. The meter valves G and $G^1$, a detail description of which will be hereinafter given, are operated by an intermittent current in circuit $1^1$ which forms one branch of circuit 1. The current in the branch $1^1$ is rendered intermittent by being short circuited periodically by means of the interrupter H. The current in branch $1^1$ is also controlled by means of the thermostat T located in the corresponding refrigerating chamber and electrically connected by the circuit 3 to operate a switch 2 which is located in branch $1^2$ of the circuit 1. When in operation the interrupter H is arranged to short circuit the circuit $1^1$ and meter $G^1$ as clearly shown in Fig. 1. The circuit 3 is made up of a non-inductive resistance 8 in series with the magnet solenoid 7 and is provided with branch connections to the needle of the thermostat T, and to contact points 4 and 5 of said thermostat. Contact of the needle with the point 5 will short circuit the resistance 8 thereby enabling the magnet of the solenoid 7 to open the switch 2 by reason of the increased current passing therethrough. Contact of the needle with the point 4 short circuits the solenoid 7 thus deënergizing the magnet and allowing the switch 2 to close. When the needle of the thermostat T contacts neither point 4 nor 5 the normal current flowing through resistance 8 and solenoid 7 is not sufficient to lift the magnet but is sufficient to sustain the magnet in its lifted position.

The operation of the parts just described is as follows: Assume the temperature in the compartment $D^1$ to be normal, the meter valve $G^1$ to be in operation with the temperature in this compartment falling in consequence, and the switch 2 open. The branch $1^3$ of the circuit 1 will be alternately completed and broken through the interrupter H thus alternately short circuiting the meter $G^1$ and then sending an intermittent or interrupted current therethrough thus causing the said valve to admit measured quantities of fluid in a manner which will be hereinafter more fully set forth in the detail description of the meter valve. When the temperature has reached the minimum desired contact is made at the point 4 thus closing the switch 2 which will in turn short circuit the meter valve $G^1$ and stop it. When the temperature reaches the maximum desired contact is made at 5 short circuiting the resistance 8 and allowing enough current to pass to lift the armature of the solenoid 7 thus breaking the short circuit of the meter valve and restoring it to the control of the interrupter H.

The motor A is operated through the circuit 9, and the switch 10 controlling this circuit is actuated through suitable electrical connections 14 with the needle of the suction pressure gage 11 on the suction pipe F. A solenoid 12 which lifts the switch 10 and a non-inductive resistance 13 are in this circuit 14. Normally the current passes through the resistance 13 and the solenoid 12 but is not sufficient to lift the switch 10. The coil 13 is like the coil 8 in its resistance properties and serves to conduct sufficient electricity to maintain the switch 10 closed after it has once been raised by the solenoid 12. When the pressure in the suction pipe F rises to the maximum desired and causes the needle of the gage 11 to engage the contact point 15 the non-inductive resistance 13 is short circuited thus allowing sufficient current to pass along the circuit marked $a$ and through the solenoid 12 to energize the armature of said solenoid causing it to close the switch 10 in the circuit 9 and start the motor.

17 and 18 are auxiliary switches employed to protect the contact points 15 and 16 of the pressure gage 11 and the switches 18 and 19 serve the same function for the contact points 21 and 22 of the pressure gage 20 on the high pressure side of the system. The passing of a current through the solenoid 12 operates first and primarily to close the switch 10 and secondarily to open switch 18 and close switches 17 and 19. In the diagram switch 10 is shown open and when in this position auxiliary switches 17 and 19 are also open and switch 18 is closed. As the pressure falls in the suction pipe F the contact between the needle of the gage 11 and the contact point 15 is broken the circuit is dead and no sparking occurs as the circuit through the point 15 has already been broken at the switch 18. When the pressure in the suction pipe has fallen to the desired minimum contact is made by the needle with the point 16 thus short circuiting the solenoid 12 through the switch 17 which is now closed, this circuit being indicated by $b$. This will deënergize the solenoid 12 causing it to open the switch 10 and stop the motor and to open the switches 17 and 19 and close switch 18.

In case an excessive pressure arises in the condenser the needle of the condenser pressure gage 20 will break the contact point 21 and make contact with the point 22 thus passing a current through the contrary coil $12^1$ of the solenoid 12 deënergizing it, opening the switch 10, and stopping the motor. The switches 17, 18 and 19 are in the positions shown when the motor is not running and in the reverse positions when the motor is in operation, their function being as previously stated to protect the contact points 15, 16, 21 and 22 from sparking when breaking contact. The auxiliary switches 17, 18 and 19 it is evident could equally as well be controlled by other means than solenoids.

Instead of meter valves G. $G^1$, etc., operated through the interrupter H, the modification shown in Fig. 3 might be substituted, in which meter valves are replaced by a suitable form of control valve 24 and an expansion valve 25. The interrupter H is not required in such arrangement and the circuit 1 controlled by the switch 2 is employed without any of the branch circuits while the thermostat T controls the switch 2 in the same manner as before.

The meter valve is constructed as follows: A valve body 26 is provided with the inlet 27 and outlet 28. A plug 29 supporting a valve seat 30 is fitted into an opening in the body 26 in alinement with the inlet opening 27. This plug and valve seat, in effect constituting a single piece, is provided with the metering chamber 31 which is made adjustable in capacity by means of the adjusting plug 32. An outlet pipe 33 with the valve 34 furnishes means by which the chamber may be cleaned or flushed out. A valve chamber 35 is formed in the valve body 26 immediately above the valve seat 30 and on the valve seat within this chamber is placed the slide valve 36. Two ports 37 and 38 controlled by the valve 36 open between the chamber 35 and the metering chamber 31 and a third port 39 leads from the said chamber 35 to the outlet 28. To actuate the valve 36 an armature 40 is provided which connects with the valve through the rod 41. A non-magnetic cap 42 surrounds the armature and about this cap is placed the energizing coil 43 connecting with the circuit $1^1$ of the circuit 1, the inclosing wall 44 and cap 45 surrounding said coil. The cap 42 is held against the valve body by means of the bolts 46 while insulating material 47 surrounds the coil 43. A spring 48 acts to press the armature away from its seat.

The operation of the valve is as follows: An interrupted current in the circuit $1^1$ passing through the coil 43 will alternately energize and deënergize the armature 42 thus in conjunction with the spring 48 causing it to move back and forth. When the valve is in the full line position shown in Fig. 2 the transverse channel $36^1$ in the valve 36 will register with the port 38 in the valve seat 30 and admit the refrigerant to the metering chamber 31, the outlet port 37 of the said chamber being closed at this time. When the slide valve 36 moves to the opposite end of its stroke the cavity $36^2$ in the bottom thereof will register with both the outlet port 37 of the chamber 31 and the outlet 39 of the valve itself thus allowing the measured quantity of refrigerant in the chamber to escape and pass from the valve to the expansion coils $d$, $d^1$, etc.

What I claim as my invention and desire to secure by Letters Patent is:

1. In an automatic system of refrigeration, in combination, a compressor, a condenser, a refrigerating compartment having an expansion coil located therein, connections between the said condenser and coil and between the coil and the compressor, an electrically operated meter valve placed in the connection leading from the condenser for admitting the refrigerating medium to the said coil, a circuit for supplying current to said meter valve, an interrupter for rendering said current intermittent, and a thermostat placed in said compartment and having electrical connections with said circuit for controlling the current to the meter valve.

2. In an automatic system of refrigeration, in combination, a condenser, a refrigerating coil, means located between the condenser and refrigerating coil for controlling the admission of the refrigerant to said coil, an electrically actuated thermostatically controlled device for controlling said means and means for producing an intermittent current in said device whereby a periodic action of said means is produced.

3. In an automatic system of refrigeration, in combination, a motor, a compressor, a condenser, one or more expansion coils, high and low pressure connections extending respectively between the expansion coils and the condenser and between the expansion coils and the compressor, separate compartments for containing each of said coils, a thermostat contained in each compartment, electrically operated valves located between the expansion coils and the high pressure connection extending to the condenser, electrical connections for controlling the said valve from the thermostat, and means for producing an intermittent current in said electrical connection whereby a periodic action of the valve is produced.

4. In an automatic system of refrigeration, in combination, a compressor, a condenser, a plurality of expansion coils, refrigerating compartments inclosing said coils, meter valves located between the condenser and expansion coils for controlling the admission of the refrigerant to said coils, a circuit in connection with each meter valve for operating same, said circuit including two branches, an interrupter located in one of said branches for passing an interrupted current through the meter valve, and a switch located in the second branch, and a thermostat for controlling said switch.

ROBERT F. MASSA.

Witnesses:
J. C. WARNES,
MARGARET A. SWEENEY.